United States Patent [19]

Eminger

[11] 4,389,023

[45] Jun. 21, 1983

[54] FLYER WINDER FOR EXTERNALLY SLOTTED DYNAMOELECTRIC MACHINE CORE MEMBER

[75] Inventor: Robert J. Eminger, Fort Wayne, Ind.

[73] Assignee: Windamatic Systems, Inc., Fort Wayne, Ind.

[21] Appl. No.: 265,657

[22] Filed: May 20, 1981

[51] Int. Cl.³ .................................. H02K 15/09
[52] U.S. Cl. .................... 242/7.05 B; 29/598; 140/92.1
[58] Field of Search .............. 242/7.05 B, 7.05 R, 242/7.14, 1.1 R, 1.1 E; 29/598; 140/92.1

[56] References Cited

U.S. PATENT DOCUMENTS

| | | | |
|---|---|---|---|
| 3,098,616 | 7/1963 | Eminger | 242/7.05 B |
| 3,411,725 | 11/1968 | Biddison | 242/1.1 R |

FOREIGN PATENT DOCUMENTS 735951  8/1955  United Kingdom ........... 242/7.05 B

*Primary Examiner*—Billy S. Taylor
*Attorney, Agent, or Firm*—Gust, Irish, Jeffers & Hoffman

[57] ABSTRACT

Apparatus for winding coils in the slots of an externally-slotted dynamoelectric machine core member comprises a flyer and a support for the core. Shroud member portions are disposed within the path of rotation of the flyer. Two rotatable wheel elements are provided on opposite sides of the core and having peripheral surfaces adjacent the shroud portion surfaces. The outer surface of each shroud portion has an outwardly extending groove therein and the peripheral surface of the respective wheel element extends into the groove thereby inhibiting rotation of the shroud member. Each of the wheel elements has a cut-out portion which communicates with its peripheral surface and which has a radially extending trailing edge which faces the respective core side as the wheel element is rotated in a direction to move the edge from the inner to the outer end of the respective shroud surface. The wheel elements are rotated in opposite directions and the cut-out portions are phase-displaced by 180° to permit passage of the flyer as the same rotates about the shroud member so that wire is initially wound around the shroud portions and alternately engaged by the leading edge of a wheel element cut-out portion and pulled thereby outwardly over the outer end of a shroud portion to guide the wire into and toward the back of the two slots.

21 Claims, 6 Drawing Figures

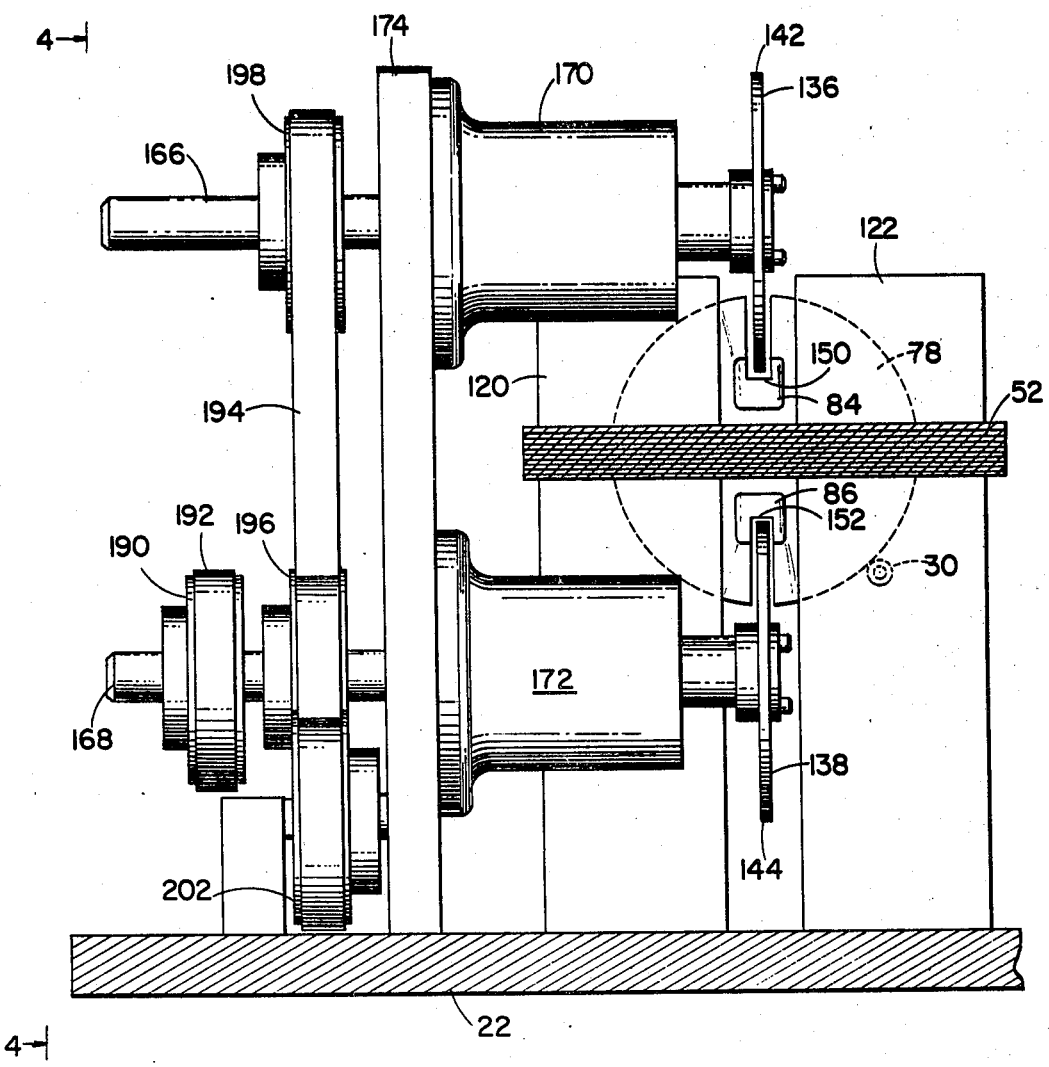

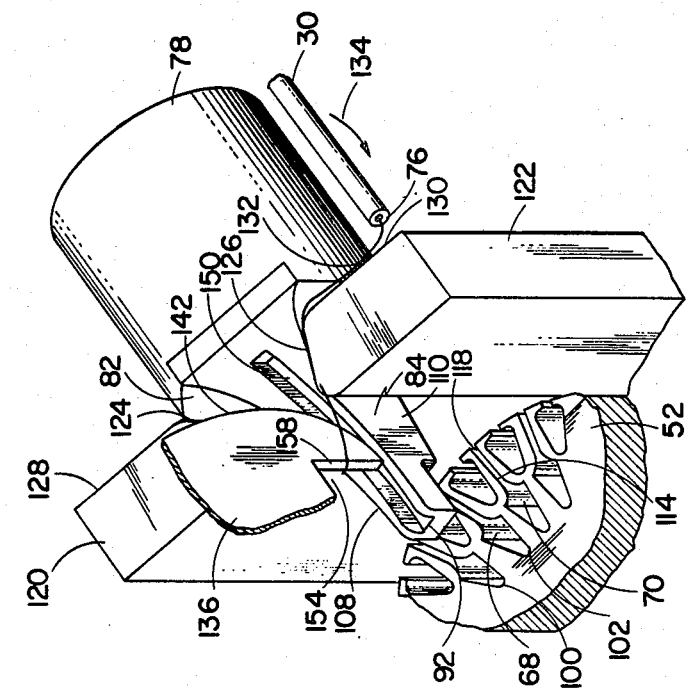
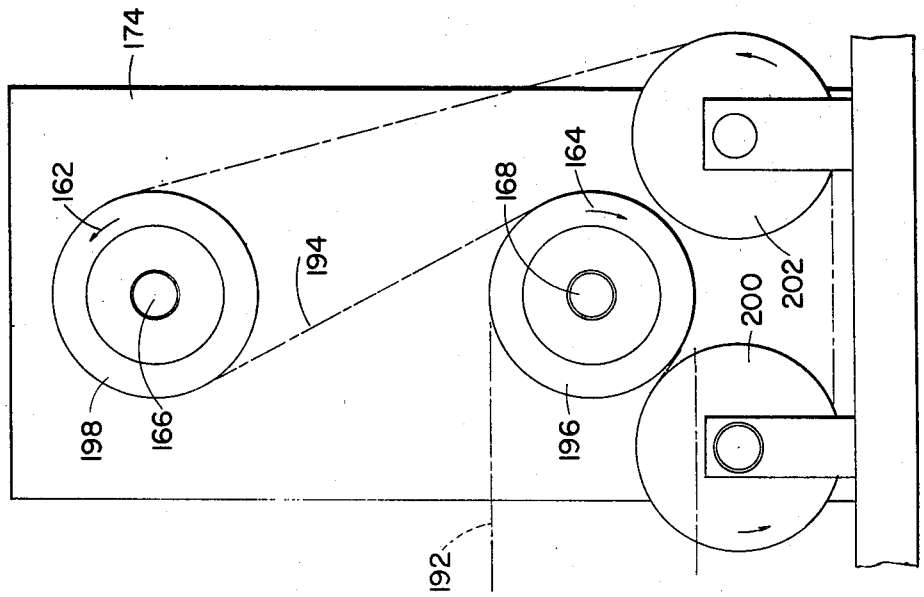

FLYER WINDER FOR EXTERNALLY SLOTTED DYNAMOELECTRIC MACHINE CORE MEMBER

BACKGROUND OF THE INVENTION

1. Field of the Invention

This invention relates generally to flyer winders for winding coils in an externally-slotted dynamoelectric machine core member, and more particularly to such a winder adapted for winding coils in relatively deep slots.

2. Description of the Prior Art

Flyer-type winders have been provided in the past for winding coils in externally-slotted dynamoelectric machine core members, such as armatures, shroud or guide elements having been provided secured to the core for guiding the wire into the respective slots. In the past, the externally-slotted dynamoelectric machine core members would by such prior flyer winders have had relatively shallow slots so that guiding the wire into the slots has presented no particular problem. Certain externally-slotted dynamoelectric machine core members, such as the stator core members for "inside-out" motors, and rotating field core members for alternators, have relatively deep slots and it has been impossible to wind coils in such deep slots by the use of prior flyer winders known to the present applicant.

It is therefore desirable to provide a flyer-type winder adapted for winding coils in the slots of an externally-slotted dynamoelectric machine core member in which the slots are relatively deep.

SUMMARY OF THE INVENTION

The invention, in its broader aspects, provides apparatus for winding a coil in two spaced slots which extend inwardly from the peripheral surface of a magnetic core member and which define a core portion therebetween around which the coil is wound, the slots communicating with spaced, parallel sides of the core member which are joined by the peripheral surface. A flyer is provided rotatable about an axis and having wire dispensing means eccentric with respect to the axis with the diameter of the path of rotation of the dispensing means being greater than the spacing between the two slots. Means is provided for supporting the core with the peripheral surface thereof in facing relationship with the path of rotation of the dispensing means. In order to guide the wire as it is being dispensed into the two slots and toward the back sides thereof, a pair of elongated shroud members is provided disposed within the path of rotation of dispensing means and respectively extending outwardly over the opposite sides of the core portion between the two slots to outer ends. Each shroud member has an outer surface which tapers to its outer end and the dispensing means initially winds the wire around the shroud members. Means is provided synchronized with the flyer for pulling wire outwardly over the outer surfaces of the shroud members and over the outer ends thereof so that the wire is guided to enter the two slots toward the back sides thereof to form a coil wound around the core portion between the two slots.

It is accordingly an object of the invention to provide improved flyer-type apparatus for winding coils in the slots of an externally-slotted dynamoelectric machine core member.

Another object of the invention is to provide improved apparatus for winding coils in the slots of an externally-slotted dynamoelectric machine core member in which the slots are relatively deep.

The above-mentioned and other features and objects of this invention and the manner of attaining them will become more apparent and the invention itself will best be understood by reference to the following description of an embodiment of the invention taken in conjunction with the accompanying drawings.

BRIEF DESCRIPTION OF THE DRAWINGS

FIG. 3 is an end cross-sectional view taken generally along the line 3—3 of FIG. 1;

FIG. 4 is a fragmentary side view taken generally along the line 4—4 of FIG. 3;

FIG. 5 is a fragmentary perspective view, partly broken away, useful in explaining the operation of the apparatus of the invention.

DESCRIPTION OF THE PREFERRED EMBODIMENT

Figure 1:
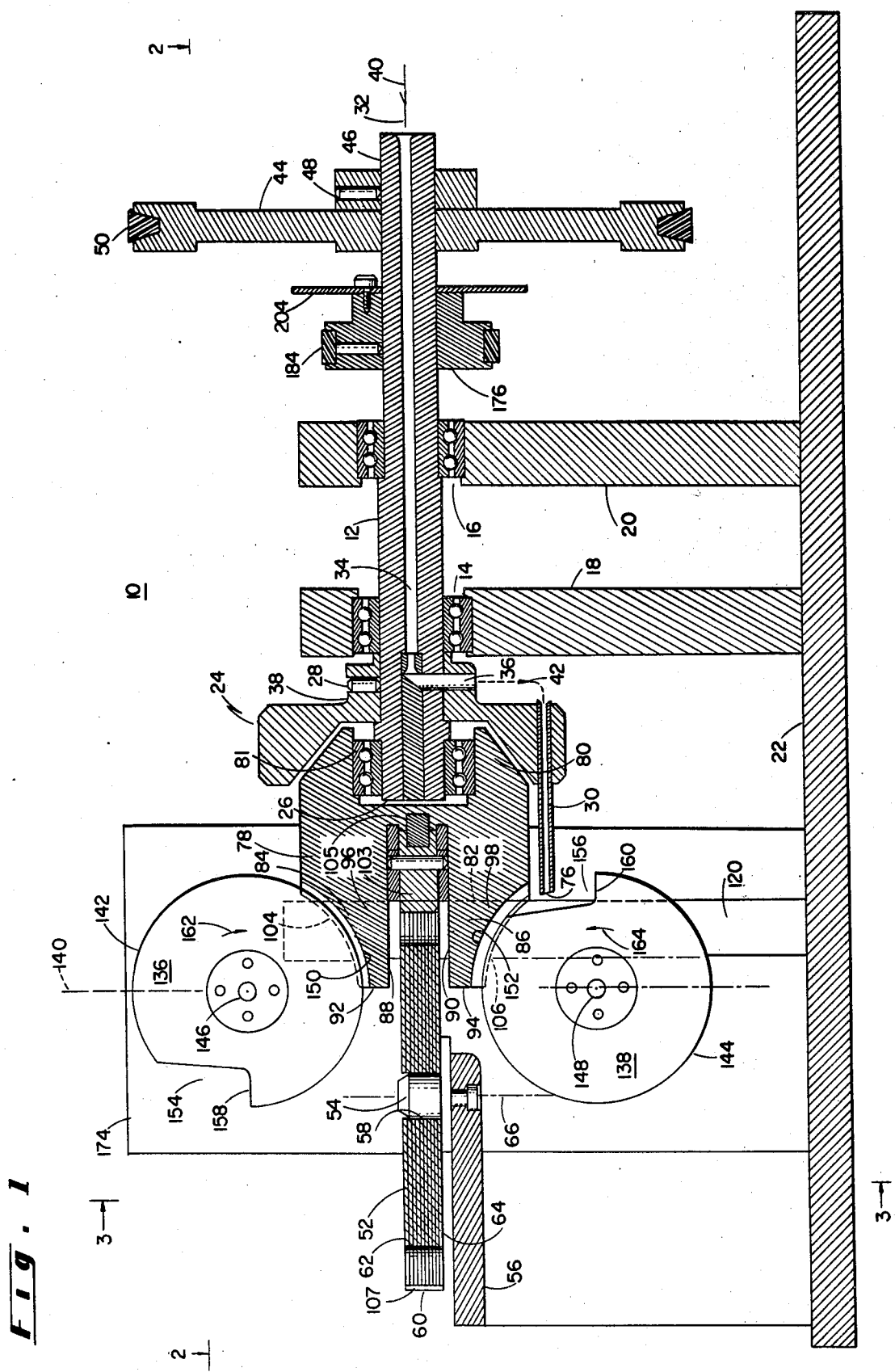
FIG. 1 is a side cross-sectional view of the apparatus of the invention.

Referring now to FIGS. 1-5 of the drawings, the apparatus of the invention, generally indicated at 10 comprises drive shaft 12 rotatably supported by bearings 14, 16 mounted in pedestals 18, 20 supported on base 22. Flyer 24 is secured to shaft 12 between end 26 and pedestal 18, as by set screw 28, and has wire dispensing tube 30 mounted thereon eccentric with respect to axis 32 of shaft 12. Shaft 12 has central passage 34 formed therethrough with lateral passage 36 extending through hub portion 38 of flyer 24 and shaft 12 to communicate with passage 34. It will readily be seen that wire to be dispensed by tube 30 of flyer 24 extends through passage 34 and 36 and through dispensing tube 30, as shown by arrows 40, 42. Drive pulley 44 is secured to outer end 46 of shaft 12, as by set screw 48, and is driven by a suitable drive motor (not shown) by suitable V-belt 50.

Externally-slotted dynamoelectric machine core member 52 is removably supported for winding by means of plug 54 on support plate 56, plug 54 extending into central opening 58, core 52 being thus supported with axis 32 of shaft 12 extending through peripheral edge 60 midway between sides 62, 64 and through core axis 66. Core 52 is cylindrical and has pairs of winding slots 68, 70 extending radially inward from peripheral surface 60 to define core portions 72 therebetween around which coils 74 are to be wound with their sides respectively seated in slots 68, 70. In the position of core 52 to have a coil 74 wound in two slots 68, 70, as shown on FIG. 2, axis 32 of shaft 12 extends through core portion 73 midway between slots 68, 70. It will also be seen in FIG. 2 that peripheral surface 60 of core 52 is closely spaced from the path of rotation of dispensing end 76 of dispensing tube 30 of flyer 24. It will also be seen that the diameter of the path of rotation of dispensing end 76 is greater than the spacing between the two slots 68, 70.

Figure 2:
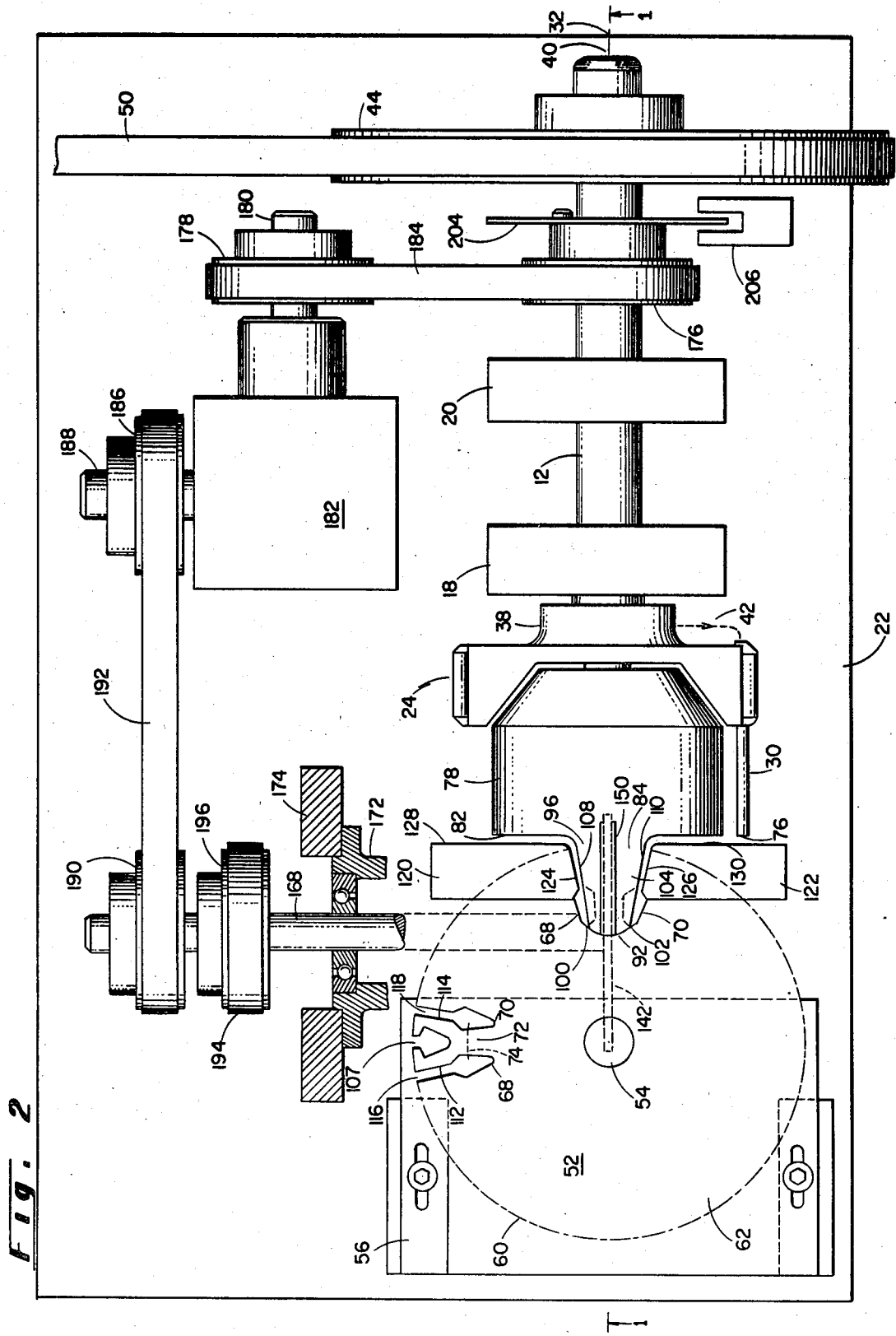
FIG. 2 is a top view, partly in cross-section and partly broken away, taken generally along the line 2—2 of FIG. 1.

In order to guide wire as it is being dispensed by dispensing tube 30 of flyer 24, shroud member 78 is provided within the path of rotation of dispensing tube 30 of flyer 24 and having its inner end 80 rotatably supported on inner end 26 of shaft 12 by suitable bearing 81. As best seen in FIG. 2, shroud member 78 has front surface 82 lying generally in the plane of the path of rotation of dispensing end 76 of dispensing tube 30 of flyer 24. Shroud portions 84, 86 extend forwardly from front surface 82 of shroud member 78 respectively over opposite sides 62, 64 of core member 52 and have bottom sides 88, 90 respectively closely spaced therefrom, as best seen in FIG. 1. Shroud portions 84, 86 reespectively have outer ends 92, 94 and inner ends 96, 98 joined to front surface 82 of shroud member 78. As best seen in FIG. 2, outer ends 92, 94 of shroud portions 84, 86 are respectively adjacent the bottom ends 100, 102 of slot 68, 70 in core 52. Locator plug 103 coaxial with shroud member 78 is biased by spring 105 to engage a slot 107 in peripheral edge 60 of core member 52 thereby properly to locate core 52 for winding.

Outer ends 92, 94 of shroud portions 84, 86 are respectively radially shorter than inner ends 96, 98 and are joined by radially outwardly facing and outwardly tapered surfaces 104, 106. Shroud portions 84, 96 have side surfaces 108, 110 which are respectively aligned with sides 112, 114 of core portion 72 thereby to expose neck portions 116, 118 which communicate between peripheral surface 60 of core 52 and portions of slots 68, 70, as best seen in FIGS. 2 and 5. Guide elements 120, 122 are supported on base 22 and have sides 124, 126 closely spaced from sides 108, 110 of shroud portions 84, 86 to define extension of neck portions 116, 118 of slots 68. 70. Guide elements 120, 122 have rear surfaces 128, 130 closely spaced from front surface 82 of shroud member 78 to accommodate wire 132 as it is being dispensed from dispensing end 76 of dispensing tube 30 of flyer 24, as best seen in FIGS. 2 and 5.

It will now be seen by reference to FIG. 5 that as flyer 24 is rotated by shaft 12 in the direction shown by arrow 134, wire 132 having its free end attached to core member 52 is withdrawn through dispensing tube 30 and passages 34, 36 in shaft 12 (FIG. 1) and is initially wound around shroud portions 84, 86 of shroud member 78 adjacent inner ends 96, 98 thereof.

In order to cause wire 132 to enter neck portions 116, 118 of slot 68, 70 of core member 52 and to be urged toward back sides 100, 102, thereof, wheel elements 136, 138 are provided on opposite sides of shroud portions 84, 86 and are disposed on axis 140 parallel with core axis 66 and generally coincident with outer ends 92, 94 of shroud portions 84, 86. Wheel elements 136, 138 are of equal diameter and have peripheral edges 142, 144. Outer surfaces 104, 106 of shroud portions 84, 86 are respectively arcuate about axes 146, 148 of wheel elements 136, 138 and have grooves 150, 152 formed therein into which peripheral edges 142, 144 of wheel elements 136, 138 respectively extend thus inhibiting rotation of shroud member 78.

Wheel elements 136, 138 respectively have cut-out portions 154, 156 formed therein respectively having leading edges 158, 160 which respectively face the opposite sides 62, 64 of core member 52 as wheel elements 136, 138 are rotated in opposite directions as shown by arrows 162, 164 to move leading edges 158, 160 from inner ends 96, 98 toward outer ends 92, 94 of shroud portions 84, 86. As best seen in FIG. 1, wheel elements 136, 138 are phased so that leading edges 158, 160 of cut-out portions 154, 156 are displaced by 180°.

Wheel elements 136, 138 are respectively mounted on shafts 166, 168 journaled in bearings 170, 172 mounted on plate member 174 supported on base 22, as seen in FIG. 3. In order to rotate wheel elements 136, 138 in synchronization with rotation of dispensing tube 30 of flyer 24 so that cut-out portions 154, 156 respectively permit passage of dispensing end 76, as seen in FIG. 1, pulley 176 on shaft 12 drives pulley 178 on input shaft 180 of gear box 182 by belt 184. Pulley 186 on output shaft 188 of gear box 182 drives pulley 190 on shaft 168 by belt 192, pulleys 176, 178, gear box 182, and pulleys 186, 190 providing a one-to-one speed ratio so that shaft 168 is rotated at the same rotational speed as shaft 12. Belt 194 is trained around pulley 196 on shaft 168, pulley 198 on shaft 166, and idler pulleys 200, 202 as best seen in FIG. 4, thus rotating shafts 166, 168 and wheel elements 136, 138 at the same rotational speed in opposite directions, as shown by arrows 162, 164.

Reference to FIGS. 1 and 5 will now show that as dispensing tube 30 of flyer 78 rotates around shroud member 78 to dispense wire 132 and wind the same around shroud portions 84, 86, leading edges 158, 160 of cut-out portions 154, 156 of wheel elements 136, 138 moving forwardly in the direction shown by arrows 162, 164 in slots 150, 152 will alternately pull wire 132 forwardly over outer surfaces 104, 106 of shroud portions 84, 86 and over ends 92, 94, so that wire 132 is pulled forwardly from the spaces between front surface 82 of shroud member 78 and rear surfaces 128, 130 of guide elements 120, 122 into the spaces between side surfaces 108, 110 of shroud portions 84, 86 and side surfaces 124, 126 of guide elements 120, 122 and then into neck portions 116, 118 and finally into slots 68, 70 toward back sides 100, 102 thereof.

Toothed wheel 204 mounted on pulley 176 cooperates with magnetic pick-up element 206 (FIGS. 1 and 2) to generate timing pulses for providing a digital readout of the rotational speed of shaft 12, flyer 24, and wheel elements 136, 138, as is well known to those skilled in the art.

Figure 6:
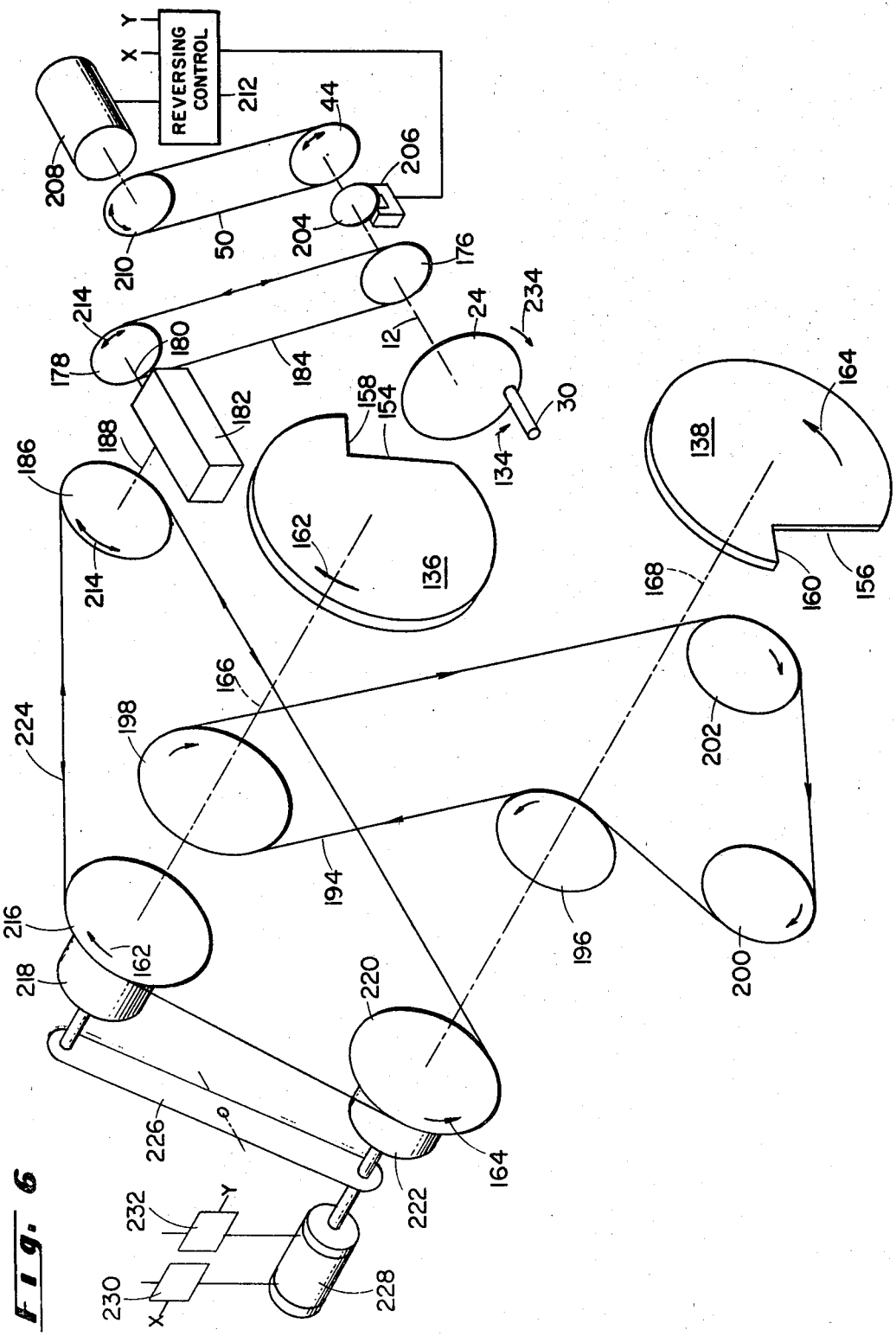
FIG. 6 is a view schematicaly showing a reversible embodiment of the apparatus of the invention.

It will be readily understood that it may be desirable to provide for reversal of flyer 24, however, wheel elements 136, 138 must always operate in the same directions shown by arrows 162, 164, respectively, in either direction of rotation of flyer 24. Referring now to FIG.6 in which like elements are indicated by like reference numerals, there is shown one system for reversing the direction of rotation of flyer 24 while rotating wheel elements 136, 138 in the same opposite directions 162, 164. Here, reversible motor 208 drives shaft 12 and flyer 24 through pulley 44, pulley 210 and belt 50. Motor 208 is controlled by conventional reversing and speed control 212 coupled to pick-up 206. In operation, with flyer 24 being rotated in one direction, pick-up 206 provides an early warning signal when flyer 24 has wound a predetermined number of turns of wire in slots 68,70 in core member 52 short of the total desired number of turns in the coil, and reversing control 212 accordingly reduces the speed of motor 208 and flyer 24 until the desired total number of turns has been reached at which time motor 208, is deenergized after properly centering dispensing tube 30 of flyer 24, all as is well known to those skilled in the art.Control 212 may be preprogrammed to energize motor 208 to rotate flyer 24 in the opposite direction for winding the next coil in another pair of slots 68, 70 in core member 52, as is also well known to those skilled in the art. It will thus be seen that pulley 178 on input shaft 180 of gear box 182 and pulley 186 on output shaft 188 may be operated in opposite directions as shown by arrows 214 whereas, wheel elements 136, 138 must always be rotated in their respective directions 162, 164. In order to at all times rotate wheel elements 136, 138 in directions 162, 164 respectively, pulley 216 is selectively coupled to shaft 166 by mechanically actuated clutch 218 and pulley 220 is selectively coupled to shaft 168 by mechanically actuated clutch 222, and belt 224 is trained around pulley 186 and both pulleys 216, 220 as shown. Clutches 218, 222 are selectively actuated by pivoted lever member 226 which, in turn, is actuated by pneumatic cylinder 228.

Clutch 218 is of conventional type which is adapted, when actuated, to couple pulley 216 to shaft 166 and when deactuated, to decouple pulley 216 from shaft 166. Clutch 222 similarly is adapted, when actuated, to couple pulley 220 to shaft 168 and, when deactuated, to decouple pulley 220 from shaft 168. It will be observed that belt 194 drivingly connects both pulleys 196, 198 and thus that driving one shaft 166, 168 will result in driving the other. Cylinder 228 is actuated by suitable solenoid valves 230, 232 coupled for actuation to reversing control 212, as shown at X—X and Y—Y, respectively. Thus when reversing control 212 energizes motor 208 to rotate shaft 12 and flyer 24 in the direction shown by arrow 134, pulley 220 will be rotated in the direction shown by arrow 164 and clutch 222 is actuated to drive wheel element 138 in direction 164 while clutch 218 is deactuated to permit pulley 196 to drive pulley 198 through belt 194 and thus to drive wheel element 136 in direction 162 while pulley 216 is being rotated in the opposite direction 164. Likewise, with reversing control 212 operating motor 208 in the opposite direction so as to rotate flyer 24 in the direction shown by arrow 234, pulley 216 is rotated in direction 162 and clutch 218 is actuated thereby to couple pulley 216 to shaft 166 so as to rotate wheel element 136 in direction 162, clutch 222 being deactuated to decouple pulley 220 from shaft 168. Clutches 218, 222 may be of any conventional type and may be electrically actuated rather than pneumatically actuated as shown in FIG. 6.

It will be readily understood that other systems and mechanisms may be employed for at all times rotating wheel elements 136, 138 in the same opposite directions 162, 164 when flyer 24 is operated in either in direction 134 or direction 226. It will also be understood that while the apparatus of the invention has been illustrated and described in connection with winding coils in an externally-slotted dynamoelectric machine core member, the apparatus of the invention may equally advantageously be employed for winding coils in the slots of internally sltoted magnetic core members for other apparatus. It will also be understood that conventional apparatus for indexing core member 52 may be provided.

While there have been described above the principles of this invention in connection with specific apparatus, it is to be clearly understood that this description is made only by way of example and not as a limitation to the scope of the invention.

What is claimed is:

1. Apparatus for winding coils in the slots of a dynamoelectric machine core member having spaced, parallel sides joined by a peripheral edge with the slots extending inwardly from the periphery edge, said apparatus comprising: a flyer rotatable about a first axis and having means for dispensing wire eccentrically disposed with respect to said first axis; first means for rotating said flyer; means for supplying wire to said dispensing means; means for supporting the core with said first axis extending through the peripheral edge thereof substantially midway between the two slots in which a coil is to be wound, and substantially parallel with and midway between the core sides, and with the peripheral edge adjacent the path of rotation of said dispensing means; a shroud member disposed within the path of rotation of said flyer, said shroud member having a rotatable connection with said flyer and having portions adapted to extend outwardly therefrom respectively over each side of the core and closely spaced therefrom for guiding wire as it is being dispensed toward the back of said two slots, said shroud portions being adapted respectively to overlay the sides of the core portion between said two slots, said shroud portions respectively having outer ends and inner ends adjacent said path of rotation of said dispensing means with said outer ends being respectively radially shorter than said inner ends with respect to said first axis, said inner and outer ends of each of said shroud portions being joined by a radially outwardly facing, outwardly tapered surface; two rotatable wheel elements respectively disposed on opposite sides of the core on a second axis generally normal to said first axis, said wheel elements having peripheral surfaces respectively adjacent said shroud portion surfaces, one of each of said shroud portion surfaces and the respective wheel element peripheral surface having means cooperating wiht the other for inhibiting rotation of said shroud member, each of said wheel elements having a cut-out portion formed therein communicating with said peripheral surface thereof and forming a generally radially extending leading edge which faces the respective core side as the wheel element is rotated in a direction to move said edge from the inner to the outer end of the respective shroud surface; second means for rotating said wheel elements respectively in said directions and in synchronism with rotation of said flyer, said wheel element rotation directions being opposite, said wheel elements being rotationally phased so that said cut-out portions are respectively disposed to permit passage of said dispensing means as the same rotates about said shroud member whereby wire dispensed by said dispensing means is initially wound around said shroud portions and alternately engaged by said leading edge of a respective wheel element cut-out portion and pulled thereby outwardly over said outer end of a respective shroud portion thereby to guide the wire into and toward the back of the respective two slots.

2. The apparatus of claim 1 wherein the diameters of said wheel elements are equal, each of said shroud portion surfaces being arcuate about the axis of the respective wheel element.

3. The apparatus of claim 2 where in said rotation inhibiting means comprises a radially extending groove formed in said surface of each of said shroud elements, said peripheral surface of each of said wheel elements extending into the respective groove.

4. The apparatus of claim 1 wherein each of said shroud portions has side surfaces respectively generally aligned with adjacent sides of said core portion so as to expose said two slots for the dispensing of wire therein.

5. The apparatus of claim 4 further comprising a guide element on each side of each said shroud portion and having a surface closely spaced from the respective shroud portion side surface to define an extension of the respective slot therewith.

6. The apparatus of claim 5 wherein said shroud member has a front surface from which said shroud portions extend, said guide elements having rear surfaces closely spaced from said front surface of said member whereby the wire dispensed by said dispensing means initially extends through the spaces between said front and rear surfaces and around said shroud portions adjacent said inner ends thereof and then is alternately pulled by said wheel element cut-out portion leading edges over said shroud portion surfaces and outer ends through said slot extensions.

7. The apparatus of claim 6 wherein the diameters of said wheel elements are equal, each of said shroud portion surfaces being arcuate about the axis of the respective wheel element, said rotation inhibiting means comprising a radially extending groove formed in said surface of each of said shroud elements, said peripheral surface of each of said wheel elements extending into the respective groove.

8. The apparatus of claim 7 wherein said leading edges of said cut-out portions of said wheel elements are respectively phase-displaced by substantially 180°.

9. The apparatus of claim 8 wherein the peripheral edge of the core member is cylindrical about a third axis, said first axis extending through the third axis, said second axis being parallel with the third axis and spaced therefrom toward said shroud member.

10. The apparatus of claim 9 further comprising means for drivingly connecting said first rotating means to said second rotating means.

11. The apparatus of claim 1 wherein said first rotating means includes means for reversing the direction of rotation of said flyer, said second rotating means including means for driving said wheel elements in the same opposite directions in both directions of rotation of said flyer.

12. The apparatus of claim 11 wherein said driving means comprises first and second rotatable shafts respectively drivingly connected to said wheel elements, means for drivingly coupling said shafts whereby said shafts and wheel elements rotate in said opposite directions, first and second drive means respectively coupled to said shafts by selectively actuatable clutch means, each of said clutch means being adapted to drive the respective shaft in one direction in response to rotation of the respective drive means in one direction and to disconnect the respective shaft from the respective drive means in response to rotation of the respective drive means in the opposite direction, and means for drivingly coupling said first driving means to both of said drive means for driving the same in one direction in response to rotation of said flyer in one direction and in the opposite direction in response to rotation of said flyer in the oppposite direction.

13. The apparatus of claim 12 wherein each of said clutch means includes means for selectively actuating the same to drivingly connect the respective shaft to the respective drive means, and further comprising means for actuating said actuating means of one of said clutch means in response to rotation of said flyer in one direction and for actuating said actuating means of the other of said clutch means in response to rotation of said flyer in the opposite direction.

14. In apparatus for winding a coil in two spaced slots which extend inwardly from the peripheral surface of a magnetic core member and which define a core porton there between around which the coil is wound, the slots communicating with spaced, parallel sides of the core member which are joined by the peripheral surface, the apparatus including a flyer rotatable about an axis and having wire dispensing means eccentric with respect to said axis, the diameter of the path of rotation of said dispensing means being greater than the spacing between the two slots, and means for supporting the core with the peripheral surface thereof in facing relationship with said path of rotation of the dispensing means, means for guiding the wire as it is being dispensed into the two slots and toward the back sides thereof comprising: a pair of elongated shroud members disposed within said path of rotation of the dispensing means and respectively extending outwardly over the opposite sides of the core portion between the two slots to outer ends, each shroud member having an outer surface which tapers to said outer ends thereof, said dispensing means initially winding wire around said shroud members; and means synchronized with said flyer for pulling wire outwardly over said outer surfaces of said shroud members and over said outer ends thereof whereby the wire is guided to enter the two slots toward the back sides thereof to form a coil wound around the core portion between the two slots.

15. The apparatus of claim 14 wherein said outer ends of said shroud members are adjacent the back sides of said two slots.

16. The apparatus of claim 15 wherein said shroud members respectively have side surfaces generally aligned with the sides of the core portion between the two slots thereby to expose the same.

17. The apparatus of claim 14 wherein said pulling means includes means for pulling the wire alternately over said outer surfaces of first one and then the other of said shroud members.

18. The apparatus of claim 17 wherein said pulling means comprises two rotatable members respectively disposed on opposite sides of said shroud members, each of said rotatable members having a portion adapted to engage the wire wound over a respective shroud member and to pull the same over the outer surface and end thereof.

19. The apparatus of claim 18 therein said rotatable means portions are phased substantially 180° apart.

20. The apparatus of claim 19 wherein said rotatable members comprise wheel elements having peripheral edges respectively adjacent said outer surfaces of said shroud members, said wheel elements respectively having cut-out portions which define said portions.

21. The apparatus of claim 20 wherein said outer ends of said shroud members are adjacent the back sides of said two slots, said shroud members respectively having side surfaces generally aligned with the sides of the core portion between the two slots thereby to expose the same.

* * * * *